April 16, 1963 J. F. SUTTON 3,085,770
AIRCRAFT PROPULSION SYSTEM

Filed Sept. 22, 1960 5 Sheets-Sheet 1

INVENTOR.
JAMES F. SUTTON
BY
George C. Sullivan
Agent

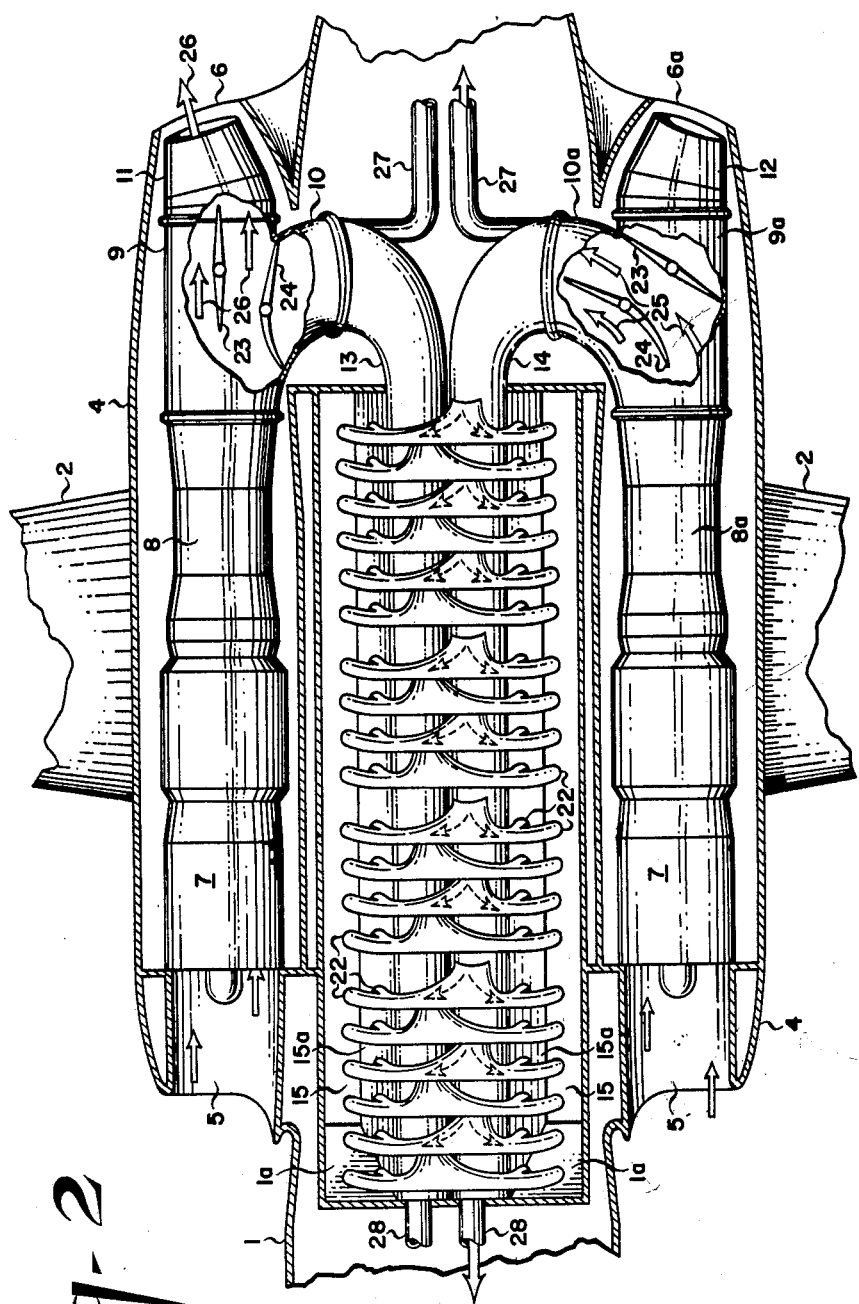

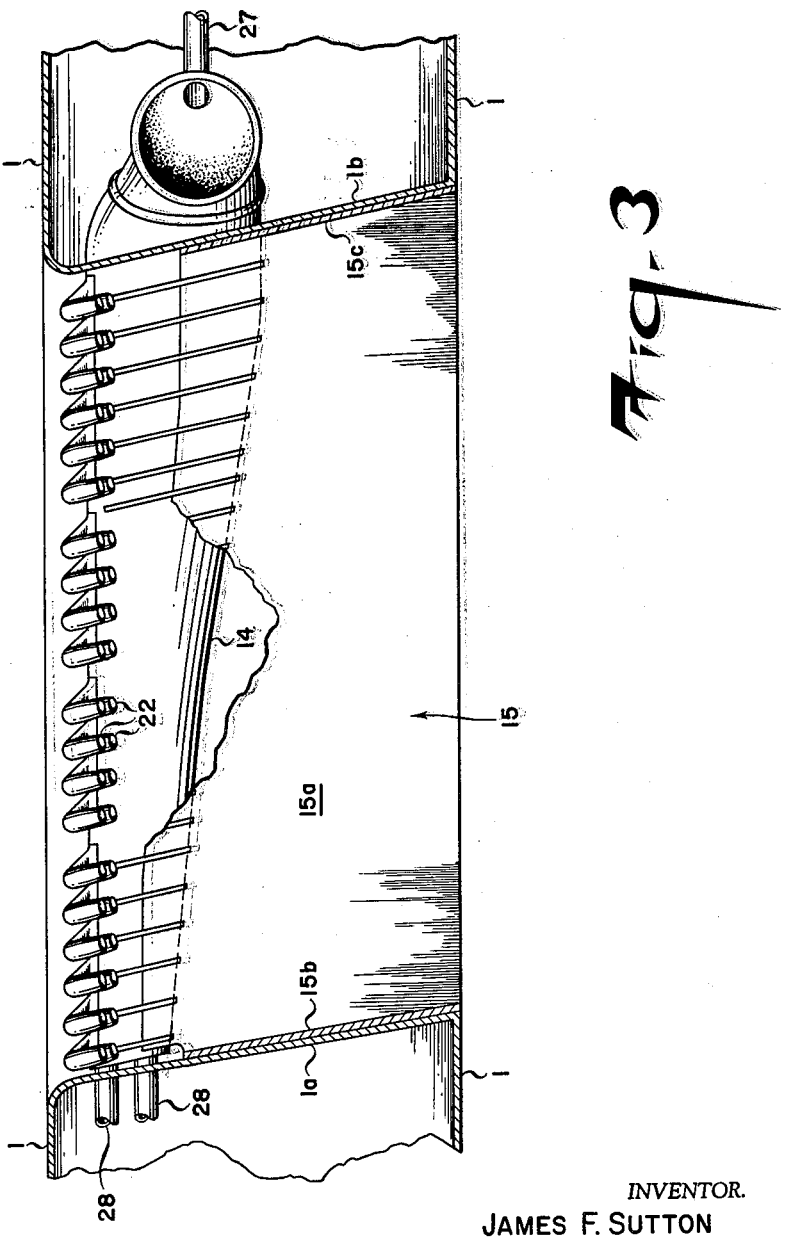

April 16, 1963  J. F. SUTTON  3,085,770
AIRCRAFT PROPULSION SYSTEM
Filed Sept. 22, 1960  5 Sheets-Sheet 4

INVENTOR.
JAMES F. SUTTON
BY
George C. Sullivan
Agent

United States Patent Office 3,085,770
Patented Apr. 16, 1963

3,085,770
AIRCRAFT PROPULSION SYSTEM
James F. Sutton, Marietta, Ga., assignor to Lockheed
Aircraft Corporation, Burbank, Calif.
Filed Sept. 22, 1960, Ser. No. 57,656
10 Claims. (Cl. 244—23)

This invention relates to aircraft propulsion systems, and more particularly to reaction jet propulsion systems capable of accomplishing vertical takeoff and landing of an aircraft as well as high speed horizontal flight.

An aircraft having VTOL (vertical takeoff and landing) capabilities as well as hovering ability is desirable from the standpoint of reduction or elimination of the extensive length of runways or prepared operating surfaces required for takeoff and landing operations of the aircraft. Further desired features are the retention of normal or high speed horizontal flight capabilities in combination with VTOL operation; and preferably such advantages being accomplished with a minimum of weight and complexity in any propulsion system incorporating these capabilities.

The portions of an aircraft flight or mission can be classified into the three portions of takeoff, cruise, and landing; and, most desirably, the takeoff and landing being effected in as short a horizontal distance as possible while the cruise portion occurs at a normal or high speed in a reasonably efficient or economical result. While the prior art includes operational VTOL vehicles as exhibited by helicopters, there are definite altitude and speed limitations inherent in such helicopters and hence, their mission efficiency and economy are limited. On the other hand, a most efficient system for horizontal speed and economical fuel consumption during cruise is the use of a fixed wing permitting attainment of high lift to drag ratios at forward speed (which in turn results in fuel savings greater than the weight of the wing), as well as improved stability due to the wing. However, takeoff and landing require an airflow over the wing for lift which is directly divergent or opposite from a VTOL operation unless a prior art arrangement of tiltable powerplants on the wing, a tilt wing, or a deflected slip stream arrangement is used. These arrangements are in turn highly complex and require a substantial overpowering of the propulsion system for the takeoff and landing mission portions if VTOL operation is to be obtained.

A further factor or difficulty that must be considered on any VTOL type aircraft is the effects of ground proximity or proximity of a ground plane to the propulsive source, such ground proximity effects capable of substantially reducing the amount of propulsive thrust attainable out of such ground effect.

Practice of the present invention accomplishes reduction, and in some cases elimination, of some of such heretofore known limitations or difficulties in VTOL propulsion systems, plus reducing the complexity of such systems and the total power output required thereby.

Accordingly, it is an object of this invention to provide an aircraft with a propulsion system capable of VTOL operation as well as high horizontal cruise speeds.

Another object of this invention is to provide an aircraft propulsion system capable of VTOL operation in addition to being able to utilize the high efficiency of a fixed wing for the cruise portion of an aircraft flight or mission between takeoff and landing.

Still another object of this invention is to provide an aircraft propulsion system for VTOL operation of an aircraft wherein the vertical thrust of the propulsion system is increased without increasing the fuel flow to the engine.

It is still another object of this invention to provide an aircraft propulsion system for an aircraft capable of VTOL operation with a configuration attaining a powerful, positive ground effect.

It is still a further object of this invention to provide an aircraft propulsion system for VTOL operation which is mechanically simple and easy to maintain and service.

Other objects and advantages will become apparent when taken in connection with the accompanying drawings in which:

FIGURE 2 is a partial cross-sectional plan view showing the propulsion gas flow system of the aircraft shown in FIGURE 1, the upper flow path as shown for horizontal thrust, and the lower flow path as shown for vertical thrust;

FIGURE 3 is a partial cross-section, elevation view of the portion of the gas flow system shown in FIGURE 2 which is utilized for vertical thrust;

Generally stated, the invention comprises an aircraft having turbo-jet powerplants combined with the airframe, the thrust of the engines being directed aft into divided or bifurcated exhaust pipes or ducts. One exhaust branch on each engine is directed and includes a propulsive nozzle to constitute the cruise nozzle, while the other branch extends to a series of downward directed jet pump nozzles located within ejector chambers extending vertically through the airframe. Flush doors along the top and bottom of the ejector chambers or passages serve as covers therefor, these doors being openable to expose the ejector mixing chambers in the fuselage to the atmosphere. The flow of the powerplant combustion product gases from the ejector or jet pump nozzles induces a secondary fluid flow from the atmosphere into and through the ejector so that the ejector efflux results in a mass flow higher than that of the jet pumps alone, and hence, a corresponding augmentation of the vertical thrust achieved by the combustion products gas flow through the primary or jet pump nozzles. The combustion products from the powerplants are divertable from flowing through the horizontal thrust producing propulsive nozzles to the vertical thrust producing jet pump nozzles whereby such vertical thrust from the jet pump nozzles is augmented by aspirated secondary airflow through the ejector chambers or passages.

Figure 1:
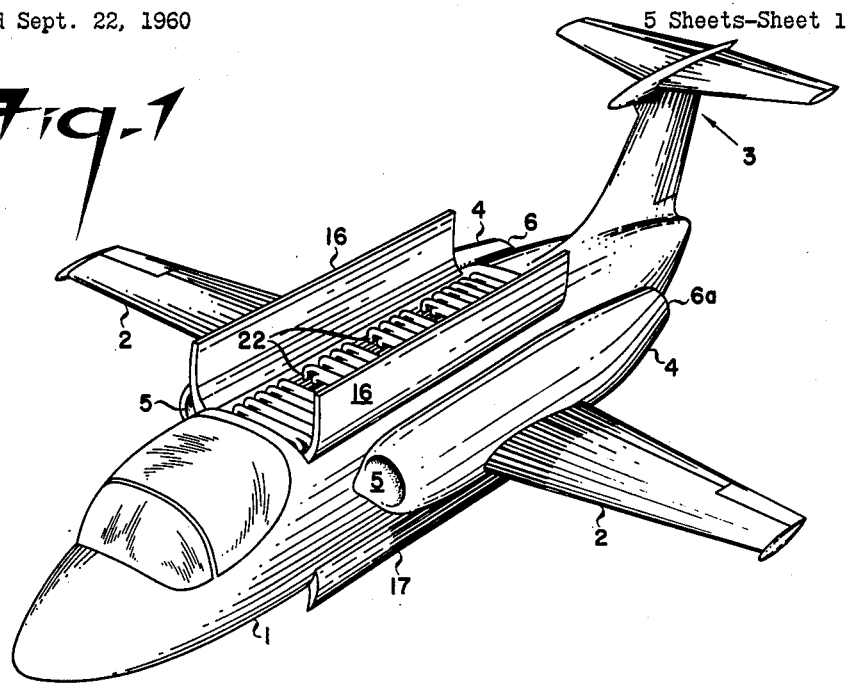
FIGURE 1 is a perspective view of an aircraft incorporating one embodiment of this invention, the drawing showing longitudinally extending doors along the top and bottom of the aircraft open for VTOL operation.

FIGURE 1 shows an aircraft comprising a fuselage 1 having wings 2 and empennage 3. A powerplant nacelle 4 having an air inlet 5 is located on each side of the fuselage 1 and extends in a direction parallel to the longitudinal axis of the aircraft. Each nacelle 4 has an exhaust outlet, which are indicated by numerals 6 and 6a respectively for the starboard and port nacelles.

Referring to FIGURES 1 through 4, turbo-jet powerplants 7 are located within each nacelle 4 and deliver hot combustion gases to exhaust ducts 8 and 8a. Both ducts 8 and 8a are bifurcated or split into two branches 9 and 10 and 9a and 10a respectively. Duct branch 9 has a propulsive nozzle 11 connected at the downstream end with the outlet of nozzle 11 arranged to direct propulsive flows through exhaust outlet 6 for horizontal thrust. Likewise, a propulsive nozzle 12 is connected to the downstream end of duct branch 9a for discharging propulsive flows through exhaust outlet 6a for horizontal thrust.

Duct branches 10 and 10a are both directed in an inboard direction and connected to ducts 13 and 14 respectively which extend longitudinally forward in juxtaposition and symmetrical about the longitudinal vertical center of the fuselage 1 along the upper portion of the fuselage. Ducts 13 and 14 have a decreasing cross-sectional area taper in a direction away from the connection to their respective duct branches 10 and 10a, the purpose of which will be explained in more detail hereinafter.

Figure 4:
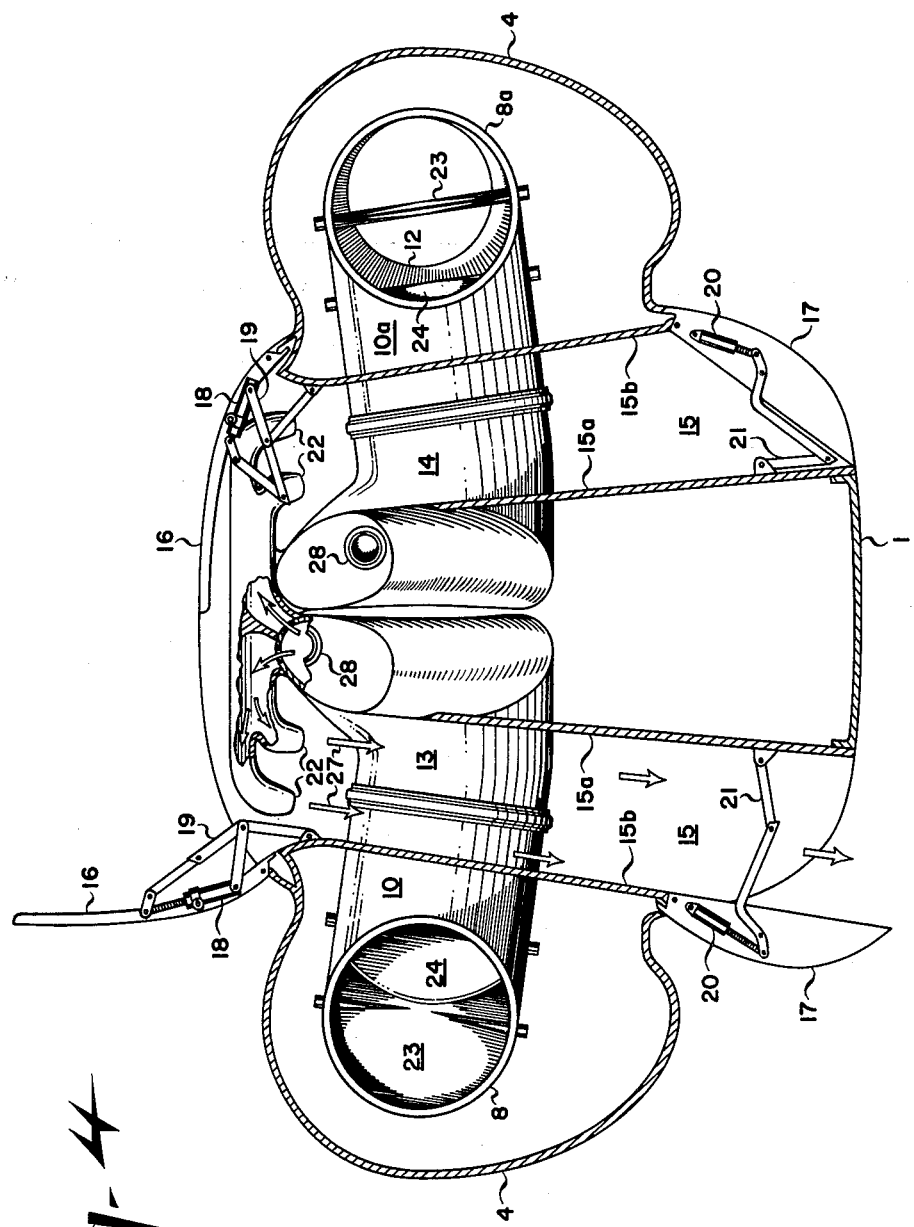
FIGURE 4 is a transverse cross-sectional view of the fuselage of the aircraft in FIGURE 1 showing the left hand upper and lower doors open and the right hand upper and lower doors closed.

Located in the fuselage between each of the ducts 13 and 14 and the powerplant nacelle 4 on their respective sides are jet pump ejector passages 15 which are controllably opened and closed to the atmosphere external to the fuselage by upper passage doors 16 and lower passage doors 17, which can best be seen in FIGURE 4. The doors 16 and 17 fit flush with the outer contour of fuselage 1 when closed as can best be seen by the doors 16 and 17 in closed position on the right hand side of FIGURE 4.

The opening and closure of each door 16 is controlled by any appropriate actuator means 18 and linkage arrangements 19, while the opening and closing of each door 17 is controlled by an appropriate actuator means 20 cooperating with an appropriate linkage mechanism 21.

A plurality of ejector nozzles 22 are connected to ducts 13 and 14 extending along the upper portions of passages 15 and arranged to discharge primary ejector fluid into ejector passages 15, this primary ejector fluid being supplied by the combustion products discharge from turbojet powerplants 7 passing through exhaust ducts 8 and 8a into branches 10 and 10a and ducts 13 and 14. The exact configuration and arrangement of the primary nozzles 22 is as described in more detail and claimed in copending application Serial Number 88,571 assigned to the same assignee as the instant invention, it being understood that the only critical requirement in this invention is the fact that high temperature, high pressure propulsive fluid be discharged from ducts 13 and 14 into ejector passages 15. The taper of ducts 13 and 14 is provided to minimize space and volume requirements for the ducts.

Vertical or hover operation of the aircraft is accomplished by the closure of a valve 23 located in each of the duct branches 9 and 9a and opening of the valve 24 located in duct branches 10 and 10a while powerplants 7 are operating. The combustion products propulsive fluid discharging from powerplant 7 is then diverted into ducts 13 and 14, as can best be seen by the flow arrows 25 in FIGURE 2 indicating diverted flow into duct 14, it being noted that the flow arrows 26 in the upper portion of FIGURE 2 represent the combustion products propulsive fluid discharge from powerplant 7 through propulsive nozzle 11 when valve 24 is closed and valve 23 open for horizontal flight propulsion. When the propulsion fluid is diverted into ducts 13 and 14 for discharge through primary ejector nozzles 22 (as can best be seen by flow arrows 27 in FIGURE 4), a thrust augmentation is accomplished by aspiration of the ambient air located above the upper surface of the fuselage downwardly through ejector passage 15. In its simplest form, the ejector 15 consists of a chamber open at its upper and lower ends (by the opening of doors 16 and 17) which surrounds the primary blowing jets or jet pump nozzles 22. The flow from primary nozzles 22 induces a secondary flow of ambient air into and through the ejector passages 15 so that a mass flow higher than that of the primary jet through nozzles 22 alone is created through the ejector passages 15. By this the momentum of the system is increased whereby the thrust of the primary jet is augmented.

In order to provide yaw, pitch and roll control of the aircraft during hover or vertical ascent or descent, such may be accomplished by the utilization of reaction control nozzles located in the under surface of the tips of wings 2 and the fore and aft portions of fuselage 1. The fluid for such reaction control nozzles may be supplied by pipes or conduits 27 extending aftward from the rearmost portion of ducts 13 and 14 and pipes or conduits 28 extending forward from the foremost end or portions of ducts 13 and 14, it of course being understood that if fluid sources other than the propulsion system be provided, then the pipes or conduits 27 and 28 may be eliminated or dispensed with.

Figure 6:
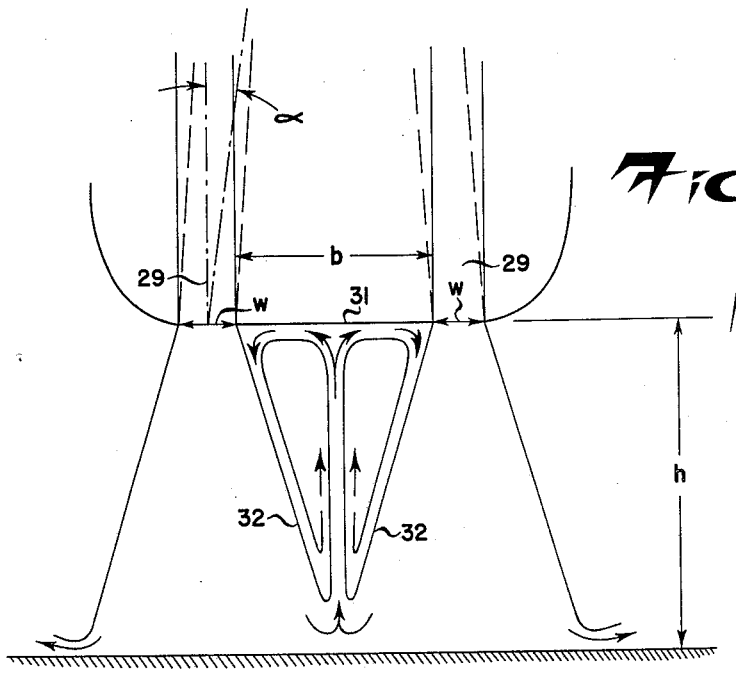
FIGURE 6 is an explanatory schematic showing of ejector passages vertical effluxes relative to proximity with a ground plane.
Figure 5:
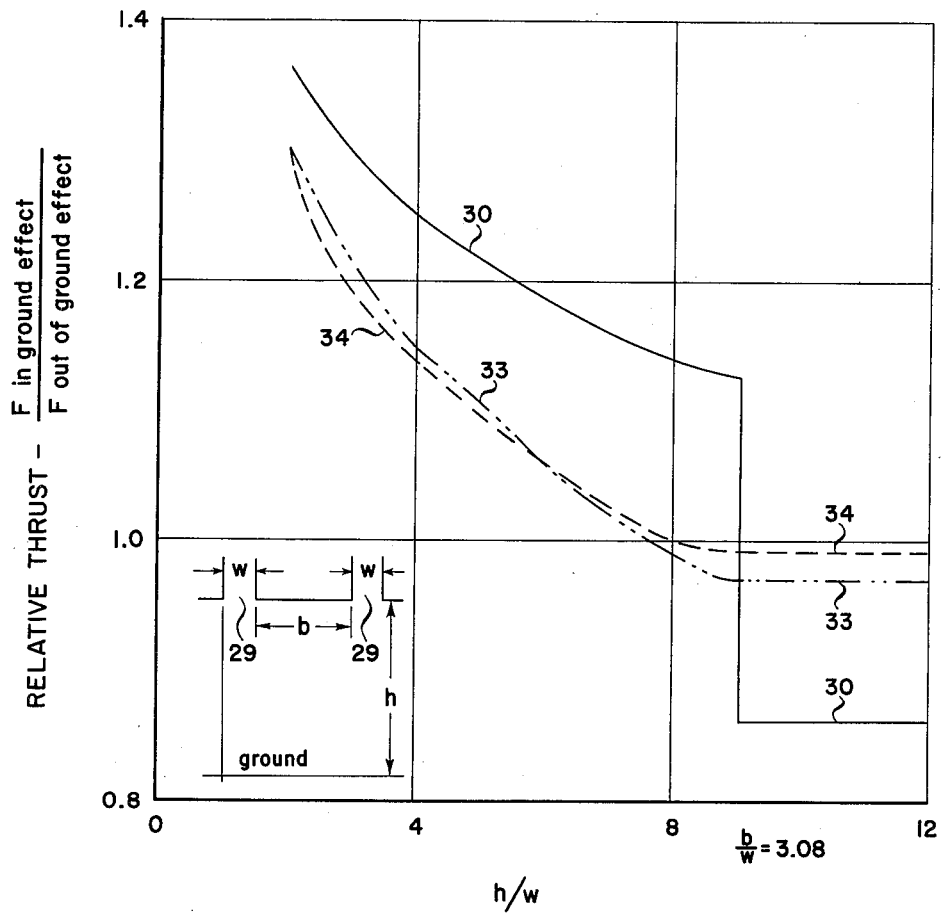
FIGURE 5 shows the curves indicating the relationship of ground proximity to ejector thrust augmentation for different ejector passage configurations encompassed by the present invention.

The proximity to the ground of the ejector passages efflux or discharge has an effect on the performance of the ejector such that there is a resultant decrease in the total thrust augmentation that would be realized if the ejectors were discharging into the ambient surrounding without impinging upon the ground plane. FIGURES 5 and 6 show graphically how such ground effect can be utilized advantageously for a pair of ejector passages of this invention for increasing the effective augmented thrust from the diffuser passages due to such ground effect. By using parallel outlets 29 of widths $w$ separated so as to provide a base $b$ between the outlets, there is created a positive base pressure in an upward direction, which at the lower heights $h$ of the outlets 29 above the ground more than compensates for the momentum thrust loss occasioned by the efflux from outlets 29 impinging upon the ground. The variation of thrust augmentation attained through ground effect of a pair of parallel outlets 29 of widths $w$, separated transversely by a base $b$ is caused by variation in the height of the ejector outlet relating to the ground plane as presented graphically by the curves in FIGURE 5. Curve 30 shows that at heights from the ground plane of the ejector's discharge below nine times the outlet width, a significant thrust augmentation due to the positive base pressure forces is obtained, such base pressure being positive and provides additional force over and above that required for compensation for the loss of momentum by reaction against the ground plane. For the particular geometry of a base to width ratio of 3.08 the two jets unite longitudinally due to lateral expansion at a height $h$ above the ground plane of nine times the widths $w$. In the case of parallel ejectors having endplates extending below the ejector exits (as in the case of curve 30), this longitudinal uniting of the jets causes a pumping of the air beneath the base area to result in the base pressure force becoming negative in an amount equivalent to 13% less thrust than would occur for two outlets without a base between them at heights $h$ higher than nine $w$.

Upon removal of the endplates the vertical cross-sectional area bounded by the base 31 located between outlets 29 in FIGURE 6 and the edges or peripheries 32 of the effluxes from ejector outlets of passages 29 becomes unobstructed. Such unobstruction due to lack of endplates significantly reduces a negative base pressure in the space or volume under the area of base 31 and bounded by the ejector effluxes peripheries 32 by permitting free entrance of ambient air into such space or volume. The antithesis to such a significant reduction, if not complete elimination, of a negative base pressure is that augmentation due to a ground proximity caused increased base pressure is reduced by the free egress of the positive pressure air from the space or volume. Curve 33 in FIGURE 5 is indicative of this condition and shows that without the endplates a less relative thrust due to ground effect is obtained at outlet heights $h$ less than $9w$ than that thrust obtained by the use of endplates as indicated by curve 30. This is occasioned by the ability of the positive base pressure forces located between the peripheries of the ejector effluxes 32 and base 31 to pass in a longitudinally fore and aft direction with a resulting less positive base pressure force than with the use of endplates. This loss of relative thrust at ejector outlet heights above ground plane below nine times the ejector outlet width becomes more efficient without the presence of endplates due to the ability of passage of ambient air in a longitudinal direction relative to the aircraft into the space or volume extending the longitudinal length of the diffuser passages having a cross-sectional area of base 31 and efflux peripheries 32 as shown in FIGURE 6, such passage of air compensating for the loss of fluid therein due to the pumping action of the ejector efflux peripheries 32. While the absence of such endplates is less efficient in that it results in a less relative thrust under ejector outlet heights above ground plane of less than nine times the ejector outlet width, such relative thrust would have a small loss relative to a pair of adjacent ejector outlets without a base $b$ therebetween when out of ground effect.

It has further been found that by slightly canting or angulating the ejector passages in an outboard direction relative to the vertical through an angle $\alpha$ in FIGURE 6, an increase of the relative thrust is achieved over the relative thrust of parallel ejector passages at ejector outlet heights above the ground of more than approximately six times the ejector outlet width. This is explained by the intersecting impingement of ejector efflux peripheries 32 occurring at a further vertical distance from base $b$ than in the case of the parallel ejectors passages, thereby creating a larger vertical cross-sectional area and volume for the ambient air to flow in to replace the air or fluid lost by the pumping action of the ejector effluxes. Such replacement air is moving at a slower velocity, due to the increased cross-sectional entrance area available for passage, which in turn results in a greater static pressure reacting on base $b$. Likewise, at ejector outlet heights above ground level of less than approximately six times the ejector outlet width, this larger vertical cross-sectional area formed by base 31 and ejector efflux peripheries 32 permits a greater loss of the excess or positive base pressure over and above the thrust loss resulting from momentum loss by ground impact in the case of the parallel ejectors. Thus below approximately an $h/w$ ratio of approximately six there is a less resultant thrust in the case of the canted or angulated ejector passages than with the parallel ejector passages. It is to be noted that this loss of relative thrust between the canted or angulated ejectors and the pair of parallel ejectors occurs only from an $h/w$ ratio of approximately 2.0 to approximately 6.0, the canted or angulated ejector passages beyond a $h/w$ of 6.0 having a relative thrust loss relative to two adjacent ejectors without a base of approximately one-third the loss with the two parallel ejectors as indicated by the differences between the right hand portions of curves 33 and 34 in FIGURE 5.

The optimum and maximum transverse cant angle $\alpha$ of the ejector passages to achieve the above discussed maximum positive base pressure varies and is a function of the base width $b$ between ejector exits and the ejector exit widths $w$. The curves shown in FIGURE 5 are based on a $b/w$ of 3.08 and cant angles $\alpha$ of each ejector passage 5° relative to the vertical. As the base width $b$ increases, the cant angle $\alpha$ for maximum positive base pressure, and hence maximum thrust, increases up to a maximum angle $\alpha$. The maximum angle $\alpha$ for any configuration without loss of thrust is approximately 10°, and the precise optimum and maximum angle $\alpha$ for any configuration is dependent upon the realization of maximum thrust on the composite augmentation curve based upon the basic ejector thrust less loss due to ground impact momentum loss. Experimentation has indicated under the most extreme configurations such maximum, optimum angle $\alpha$ does not exceed 10° quantitatively.

Referring to FIGURES 2, 3 and 4, and more particularly to FIGURE 3, it has been found that transition from vertical to horizontal flight, or vice versa, can be more easily accomplished by angulating or canting the primary ejector nozzles 22 as well as the ejector passages in an aftward direction relative to the vertical. The upper and lower surfaces of fuselage 1 are connected in a vertical sense by a panel or plate segment 1a that is angulated relative to the vertical in a downwardly and aft direction and forms the forward wall of the ejector passage 15. The upper and lower surfaces of the fuselage 1 are connected at the aft end of ejector passage 15 by a panel or plate member 1b similar to the forward plate 1a, the two members 1a and 1b diverging slightly in a downward direction. The innermost or inboard surface of ejector passage 15 is formed by a panel 15a extending longitudinally between plates 1a and 1b and vertically from ducts 13 and 14 down to the bottom of fuselage 1, panel 15a diverging slightly relative to outboard panel 15d the same as for panels 1a and 1b. The fore and aft ends of plate 15a are flanged to provide flanges 15b and 15c, flange 15b parallel to and in juxtaposition with plate 1a, while flange 15c is parallel to and in juxtaposition with plate 1b. In this manner, the ejector passages 15 attain a vertical, longitudinal trapezoid cross section.

The primary ejector nozzles 22 are angulated to substantially the same extent as the end panels 1a and 1b of passages 15 minus the divergency angle so as to discharge the efflux in a downward and aft direction.

With the ejector passages 15 so angulated in a downward and aft direction at the time of takeoff the aircraft may be tilted in a nose-up attitude to a slight extent by an extendable nose gear, or any other means, so that the efflux from ejector passages 15 will be in a substantially vertical direction. This will place the wings in a substantial angle of attack attitude, and as soon as sufficient vertical ascent is accomplished the nose-high attitude of the aircraft can be decreased whereupon there is then a vertical as well as a horizontal force or propulsive thrust relative to the vertical due to such angulation, this in turn causing a forward velocity of the aircraft. This forward velocity will result in some lift by the wings having a velocity relative to the ambient air. It is also to be noted that while this forward velocity is rather slow, there is a substantial angle of attack of the wings and as the forward velocity increases the nose-high attitude of the aircraft can be reduced, thereby reducing the angle of attack of the wings, until a horizontal velocity of the aircraft is achieved sufficient to accomplish sustentation of the aircraft by the wings.

This backward angulation or tilt feature of the primary ejector nozzles and the ejector passages 15 is also desirable in transition from horizontal to vertical flight for landing or hovering, such being accomplished by diversion of the propulsion gases from the powerplants being directed through ducts 13 and 14, and hence through primary nozzles 22 and ejector passages 15. As such diversion is made the aircraft is placed in a nose-high attitude where the wings 2 assume a substantial angle of attack thereby creating a substantial drag at that air speed while the lift is supplied by the vertical thrust. By maintaining the nose-high attitude until the aft or main landing gear is in contact with the ground a true vertical descent without horizontal velocity is obtained.

Although a propulsion system of the type described having ejector passages 15 through fuselage 1 in an absolute vertical direction can be utilized once sufficient vertical ascent on takeoff is accomplished, there must be either a diversion of the thrust gases through the propulsive nozzles 11 and 12 or the aircraft must be tilted slightly in a nose-down direction to achieve a horizontal thrust component from the ejector passages 15. In the first method, if utilized, there is a resultant vertical propulsive thrust loss from the efflux of ejector passages 15 due to the reduction in the primary gas through nozzle 22, while if the second method is utilized there is a reduction in the angle of attack of the wings from a cruise angle to a point of no angle of attack, or in some cases even a negative angle of attack of the wings. While these problems can be handled or compensated for by controls, such difficulties can be reduced, if not eliminated, by arrangement of ejector passages 15 and primary nozzle 22 as shown in FIGURE 3.

Transition from hovering or vertical ascent to horizontal flight is accomplished by diverting the flow of propulsive fluids from one engine through its corresponding duct 13 to a flow through its corresponding aft propulsive nozzle 11, as can best be seen in FIGURE 2. Due to propulsive nozzle 11 being located transverse from the longitudinal center line of the aircraft, a yawing movement is imposed upon the aircraft due to such displacement of the thrust line relative to the longitudinal center of the fuselage. To compensate for this yaw, propulsive nozzle 11 is canted relative to the longitudinal axis of the aircraft in a horizontal plane so as to pass the resultant thrust line substantially through the center of gravity of the aircraft, and thus the yawing movement imposed on the airplane is reduced within the limits of the effectiveness of the vertical tail and empennage 3. After the aircraft has attained a forward velocity above the stalling speed, the airflow through the other duct 14 is diverted through propulsive nozzle 12, the combined thrust from the two powerplants bringing the aircraft up to cruise speed.

During normal cruise operation only one powerplant is utilized for fuel economy, with the other powerplant 7 shut down. During such one engine cruise operation the powerplant connected to propulsive nozzle 12 remains in operation while the powerplant 7 connected with nozzle 11 is shut down. Nozzle 12 is canted relative to the longitudinal center line of the aircraft similar to, but in the opposite direction of, nozzle 11 and of a lesser degree than the cant angle of nozzle 11. The reason of the lesser cant for the cruise nozzle 12 as compared to the cant angle of transition nozzle 11 is that at the higher air speeds the vertical tail of empennage 3 is more effective and hence the operation of propulsive thrust from nozzle 12 only will result in a less yaw.

In operation, both powerplants 7 are started with the starting exhaust flows ducted through propulsive nozzles 11 and 12 with valves 24 closed and valves 23 open. The upper and lower doors 16 and 17 on ejector passages 15 are opened; valves 23 are closed and valves 24 opened thereby having the propulsive flows from powerplants 7 diverted through duct branches 10 and 10a into ducts 13 and 14. These propulsive fluid flows from powerplants 7 are exhausted from primary ejector nozzles 22 in a downward direction through ejector passages 15, this downward exhaust aspirating the ambient air from proximate the upper surface of fuselage 1 to increase the mass flow downwardly through ejector passages 15 and augment the total thrust from primary nozzles 22. There is a further slight augmentation of the flow passing through the ejector exit due to ground effect as explained hereinbefore, such additional augmentation being reduced as the aircraft rises vertically, and the tilting of the aircraft nose in a downward direction from the takeoff angle or attitude will produce a forward thrust component imparting horizontal velocity to the aircraft. As the aircraft accelerates horizontally due to such aftward thrust component to a speed sufficient to attain some lift by the wings, aftward diversion of propulsive flows from the powerplant 7 connected to propulsive nozzle 11 through nozzle 11 is accomplished by closing valve 24 and opening valve 23. As the aircraft air speed picks up, the other powerplant propulsive flow that is still being diverted through duct 14 is then directed aftward through propulsive nozzle 12 by the closing of its associated valve 24 and opening valve 23. Thereafter the propulsive flow through nozzle 11 can be ceased or terminated by shutdown of its associated powerplant and cruise is maintained by the flow through nozzle 12, the cruise air speed being sufficient that control of the aircraft is accomplished through the conventional controls. Once the fluid flows from powerplants 7 are directed through nozzles 11 and 12, closure of upper doors 16 and lower doors 17 provides an aerodynamically clean aircraft for high speed horizontal flights.

Vertical landing is achieved by a reversal of the takeoff procedure which consists of opening the upper doors 16 and 17 and bringing the nose of the aircraft up to increase the drag with a concurrent diversion of one of the powerplant's fluid flow in a downward direction through ejector passages 15.

Accordingly, it can be seen the invention provides an aircraft propulsion system having high speed horizontal flight capabilities as well as a true vertical takeoff and landing arrangement wherein vertical thrust is increased without increasing the engine's fuel flow and wherein powerful positive ground effect is accomplished; all through a system that is mechanically simple.

While a particular embodiment of the invention has been illustrated and described, it will be obvious to those skilled in the art that various changes and modifications may be made without departing from the invention, and it is intended to cover in the appended claims all such modifications and equivalents as fall within the true spirit and scope of this invention.

What is claimed is:

1. In an aircraft an aircraft propulsion system in combination with an airframe comprising, propulsive gas stream producing powerplant means including horizontal propulsive nozzles for producing horizontal thrust, at least two ejector passages contained within and extending downward through the airframe, said ejector passages symmetrically placed relative to the vertical axis of the airframe and each rectangularly plan shaped cross-sectionally by a pair of confronting sidewalls and a pair of confronting end walls, the length of said rectangular cross-section extending parallel to the airframe longitudinal axis, and the width of said rectangular cross-section extending perpendicular to the airframe longitudinal axis, a plurality of jet pump nozzles located proximate the upper portion of each of said ejector passages, and means interconnecting said powerplant means and said jet pump nozzles for diversion of said propulsive gas streams from horizontal propulsive thrust nozzles to said jet pump nozzles for downward ejection from said ejector passages for vertical thrust, said vertical thrust being augmented by aspiration of air ambient to the upper portion of the ejector passages downwardly therethrough by the propulsive gas streams from the jet pump nozzles.

2. In an aircraft the combination as claimed in claim 1 wherein the side walls are angulated relative to each other whereby the width of the ejector passage diverges in a downward direction.

3. In an aircraft the combination as claimed in claim 1 wherein the end walls are angulated relative to each other whereby the length of the ejector passage diverges in a downward direction.

4. An aircraft propulsion system in combination with an airframe comprising, at least two ejector passages contained within and extending downward through the fuselage and symmetrically placed relative to the longitudinal vertical center of the airframe, each of said passages canted outwardly in a downward direction relative to the longitudinal vertical center of the airframe so as to form a pair of passages diverging downwardly relative to each other when combined with the antipodal passage symmetrically located on the opposite side of the longitudinal vertical center, a plurality of jet pump nozzles located proximate the upper portion of each of said passages, means producing propulsive gas streams carried by the airframe, and combined propulsive nozzle and duct means connected to both said jet pump nozzles and propulsive gas streams producing means, said combined propulsive nozzle and duct means conductnig the propulsive gas streams flow to said jet pump nozzles for downward ejection from said ejector passages for vertical thrust and to the propulsive nozzle for ejection therefrom for horizontal thrust.

5. An aircraft propulsion system in combination with an airframe as claimed in claim 4 wherein the outward cant of each ejector passage relative to the longitudinal vertical center of the airframe is between 1½° to 5°.

6. An aircraft propulsion system in combination with an airframe comprising, at least two ejector passages contained within and extending downward through the fuselage and symmetrically placed relative to the longitudinal vertical center of the airframe, each of said passages canted afterwardly in a downward direction relative to the vertical of the airframe, a plurality of jet pump nozzles located proximate the upper portion of each of said passages, means producing propulsive gas streams carried by the airframe, and combined propulsive nozzle and duct means connected to both said jet pump nozzles and propulsive gas streams producing means, said combined propulsive nozzle and duct means conducting the propulsive gas streams flow to said jet pump nozzles for downward ejection from said ejector passages for vertical thrust and to the propulsive nozzle for ejection therefrom for horizontal thrust.

7. An aircraft propulsion system in combination with an airframe as claimed in claim 6 wherein the aftward cant of the ejector passage relative to the vertical of the airframe is between 5° and 15°.

8. An aircraft propulsion system in combination with an airframe comprising, a pair of propulsive gas stream producing powerplant means, each including a horizontal propulsive nozzle for producing horizontal thrust, at least two ejector passages contained within and extending downward through the airframe, said ejector passages symmetrically placed relative to the longitudinal vertical center of the airframe, a plurality of jet pump nozzles located proximate the upper portion of each of said ejector passages, and means interconnecting said powerplant means and said jet pump nozzles for diversion of said propulsive gas streams from said horizontal propulsive thrust nozzles to said jet pump nozzles for downward ejection from said ejector passages for vertical thrust, said vertical thrust being augmented by aspiration of air ambient to the upper portion of the ejector passages downwardly therethrough by the propulsive gas streams from the jet pump nozzles, and one of said propulsive nozzles canted horizontally from the airframe longitudinal axis whereby the resultant horizontal thrust line from said one powerplant will pass proximate the aircraft vertical axis during transition from either hover or vertical operation to horizontal flight, said horizontal cant compensating for reduced vertical tail effectivity during low horizontal speeds.

9. An aircraft propulsion system as claimed in claim 8 wherein the second of said propulsive nozzles is canted horizontally from the airframe longitudinal axis whereby the resultant horizontal thrust line from said second powerplant will pass proximate the aircraft center of gravity during single powerplant horizontal flight, said horizontal cant of said second propulsive nozzle being less than said horizontal cant for the first nozzle, said lesser horizontal cant of said second propulsive nozzle effecting reduction in vertical tail drag during horizontal flight.

10. A vertical reaction fluid propulsion system for a vehicle comprising a vehicle body, at least two elongate discharge passages directed downward from said body, said discharge passages displaced relative to each other to provide a base area therebetween, a pressurized fluid source connected to said discharge passages for discharge therefrom as effluxes, the centerlines of said discharge passages angulated relative to the vertical and each other so as to form a pair of passages diverging downwardly relative to each other, said angulation providing both a larger base area and vertical opening areas thereto defined as the area bounded by the base area plane and the confronting boundaries of pressurized fluid efflux from said passages as the confronting efflux boundaries converge due to expansion thereof.

References Cited in the file of this patent
UNITED STATES PATENTS

| | | |
|---|---|---|
| 2,464,663 | Zingg | Mar. 15, 1949 |
| 2,922,277 | Bertin | Jan. 26, 1960 |
| 2,945,641 | Pribram | July 19, 1960 |
| 2,988,303 | Coanda | June 13, 1961 |

FOREIGN PATENTS

| | | |
|---|---|---|
| 788,290 | Great Britain | Dec. 23, 1957 |
| 1,199,711 | France | June 22, 1959 |